United States Patent [19]

Nadamoto et al.

[11] Patent Number: 4,614,087
[45] Date of Patent: Sep. 30, 1986

[54] APPARATUS FOR ALARMING ABNORMAL COOLANT IN SPACE COOLING CYCLE

[75] Inventors: Hiroyasu Nadamoto, Mitaka; Koichi Yoinara, Sano, both of Japan

[73] Assignee: Nihon Radiator Co., Ltd., Tokyo, Japan

[21] Appl. No.: 637,717

[22] Filed: Aug. 6, 1984

[30] Foreign Application Priority Data

Aug. 9, 1983 [JP] Japan ................ 58-144393
Aug. 31, 1983 [JP] Japan ................ 58-159720

[51] Int. Cl.$^4$ ............................................. F25B 49/00
[52] U.S. Cl. ........................................ 62/126; 62/209; 62/228.3
[58] Field of Search ............... 62/208, 209, 214, 126, 62/129, 228.3, 323.4; 165/11; 236/94; 137/557; 340/614, 616, 626, 612, 603

[56] References Cited

U.S. PATENT DOCUMENTS 3,047,696 7/1962 Heidorn ........................ 62/209 X
3,161,740 12/1964 Schniers et al. ............. 340/626 X
4,008,755 2/1977 Vandamme ................... 62/229 X
4,221,116 9/1980 Harnish ........................ 62/209

Primary Examiner—Harry Tanner
Attorney, Agent, or Firm—Gordon W. Hueschen

[57] ABSTRACT

An apparatus for alarming abnormal coolant in a space cooling cycle, comprising a coolant passage for guiding high-pressure side liquid coolant in said space cooling cycle, a sensor disposed in said coolant passage and provided with a movable part having an operating fluid sealed therein and adapted to be operated by the difference of the pressure of said operating fluid and that of said liquid coolant, and a switch and an alarm device disposed in said coolant passage and interlocked with the movable part, and said operating fluid having higher saturated pressure than the saturated pressure of said coolant and possessing an ability to operate said switch when the extent of subcool of said coolant exceeds a prescribed level and the pressure of the coolant exceeds the pressure of said operating liquid and when the pressure of the coolant exceeds the pressure under which said operating fluid is wholly in a gasified state.

9 Claims, 9 Drawing Figures

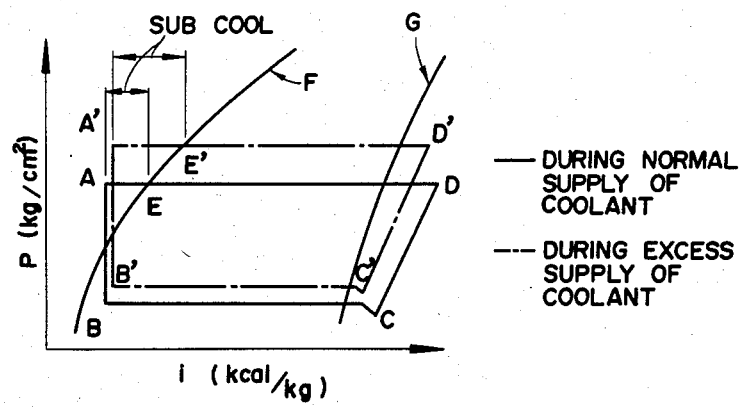
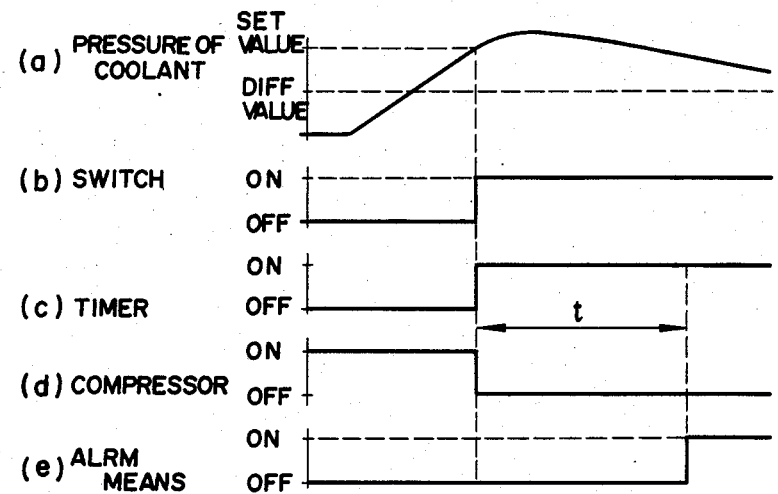
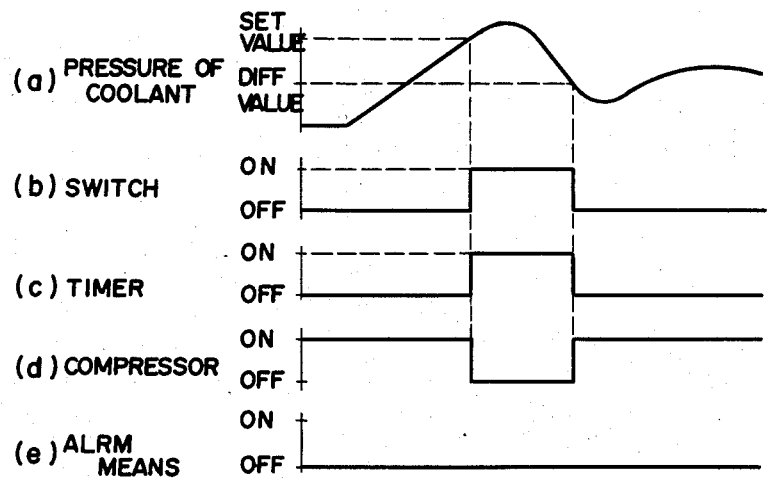

APPARATUS FOR ALARMING ABNORMAL COOLANT IN SPACE COOLING CYCLE

BACKGROUND OF THE INVENTION

1. Field of the Invention

This invention relates to an apparatus for detecting excess supply of the coolant circulated in a space cooling cycle of an automotive air conditioner or abnormal rise of pressure of the coolant and effecting a necessary measure such as sounding an alarm.

2. Description of Prior Art

Generally, space cooling cycles for automotive air conditioners are constructed as illustrated in FIG. 1. The space cooling cycle keeps a coolant circulated therein. The space cooling cycle comprises a compressor 1, a condenser 2 for causing the gaseous coolant which has been heated to an elevated temperature and compressed to an increased pressure in the aforementioned compressor 1 to be converted by cooling and condensing into a high-pressure liquid, a liquid tank 3 for depriving the coolant of moisture and dirt and effecting gas-liquid separation of the coolant, an expansion valve 4 for suddenly lowering the pressure of the coolant and consequently converting into a readily gasifiable low-pressure coolant, an evaporator 6 for evaporating the coolant and, owing to the thermal behavior of this evaporation, depriving the air in the car interior of its heat and consequently cooling the air in the car interior, and a temperature sensing tube 5 for sensing the temperature of the coolant at the outlet of the evaporator 6 and, in response to the temperature thus sensed, ajusting the opening degree of the expansion valve 4. The compressor 1 is driven by an automotive engine, though not illustrated, through the medium of a magnet clutch 8. When the temperature inside the car interior falls below a prescribed level, the magnet clutch is actuated to suspend the operation of the compressor 1 to prevent the car interior from being cooled excessively.

Since in the space cooling cycle of the automobile has its compressor driven by the car engine as described above, there is the possibility that the travelling condition of the car will alter the revolution number with which the compressor is driven and also alter the volume and pressure of the coolant circulated in the space cooling cycle.

The alteration of the volume of the coolant circulated may be moderated to some extent because the liquid tank 3 adjusts the flow volume of the coolant as occasion demands. When the space cooling cycle is not filled with a proper volume of the coolant, however, circulation of a proper volume of the coolant cannot be obtained in spite of the liquid tank 3. Particularly when the cycle is filled excessively with the coolant, the liquid tank 3 will be filled to capacity with the coolant in its liquid state, subcool of the coolant will also proceed within the liquid tank the coolant will retain a sparingly evaporable state even after passage through the expansion valve 4, and the coolant within the evaporator will fail to absorb heat sufficiently from the air. Thus, the space cooling cycle will fail to operate in its full capacity.

The aforementioned alteration of the pressure of the coolant occurs when the car speed is suddenly changed and consequently the revolution number with which the compressor is driven is abruptly altered. Especially when the pressure of the coolant is abnormally increased, there ensues the possibility that the temperature of the coolant will be elevated, the lubricant contained in the coolant will be degraded, and the cooling capacity of the cycle itself will be impaired.

To preclude the disadvantage, it has been customary for the liquid tank 3 to be provided in the upper portion thereof with a sight glass 7 as illustrated in FIG. 2 so that the flow condition of the coolant through the liquid tank 3 may be observed through the sight glass 7 and, on detection of insufficient supply of the coolant, the coolant may be properly replenished. In this case, bubbles observed in the coolant through the sight glass 7 serve as a visible sign of insufficient supply of the coolant. Absence of such bubbles, therefore, indicates proper supply of the coolant. The absence of bubbles in the coolant as observed through the sight glass does not exclusively occur when the supply of the coolant in the cycle is proper. It could occur when there is an excess supply of the coolant in the cycle. This special arrangement, therefore, has been unable to indicate accurately the excess supply of the coolant.

In another device proposed to date, the liquid tank 3 is provided with a high-pressure switch adapted to detect the pressure of the coolant, so that when the pressure of the coolant rises abnormally, this high-pressure switch will suspend the operation of the compressor and prevent the pressure of the coolant from rising abnormally. The high-pressure switch is capable of only detecting the abnormal rise of the pressure and is incapable of accurately sensing the excess supply of the coolant.

An object of the invention, therefore, is to provide a novel apparatus for warning abnormal coolant in the space cooling cycle.

Another object of this invention is to provide an apparatus for detecting excess supply of the coolant in the space cooling cycle of the automotive air conditioner and abnormal rise of pressure of the coolant and effecting a necessary measure such as sounding of an alarm, for example.

SUMMARY OF THE INVENTION

The objects described above are accomplished by an apparatus for alarming abnormal coolant in a space cooling cycle, which comprises a coolant passage for guiding high-pressure side liquid coolant in the space cooling cycle, a sensor disposed in the coolant passage and provided with a movable part having an operating fluid sealed therein and adapted to be operated by the difference of the pressure of the operating fluid and that of the liquid coolant, and an alarm-actuating switch and an alarm device disposed in the coolant passage and interlocked with the movable part, and the operating fluid having higher saturated pressure than the saturated pressure of the coolant and possessing an ability to operate the switch when the extent of subcool of the coolant exceeds a prescribed level and the pressure of the coolant exceeds the pressure of the operating liquid and when the pressure of the coolant exceeds the pressure under which the operating fluid is wholly in a gasified state.

This invention also concerns an apparatus for alarming abnormal coolant in a space cooling cycle, in which the switch serves to turn on and off a compressor and it is provided with a timer circuit for measuring the operating duration of the switch and, when the operating

BRIEF DESCRIPTION OF THE DRAWINGS

FIG. 5 is a graph showing a space cooling cycle on a Mollier diagram.

FIG. 8 is an explanatory diagram showing the operation of the apparatus of this invention when the space cooling cycle is filled excessively with the coolant.

FIG. 9 is an explanatory diagram showing the operation of the apparatus of this invention when the pressure of the coolant is abnormally high.

PREFERRED EMBODIMENT OF THE INVENTION

Now, the present invention will be described below with reference to one embodiment illustrated in the accompanying drawings.

Figure 3:
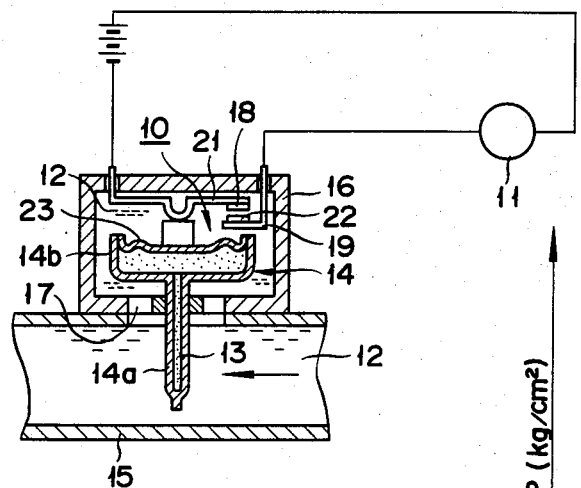
FIG. 3 is a schematic diagram illustrating an apparatus for alarming abnormal coolant in a space cooling cycle as one embodiment of this invention.

FIG. 3 is a schematic diagram illustrating an apparatus for warning abnormal coolant in a space cooling cycle as one embodiment of the present invention.

Figure 1:
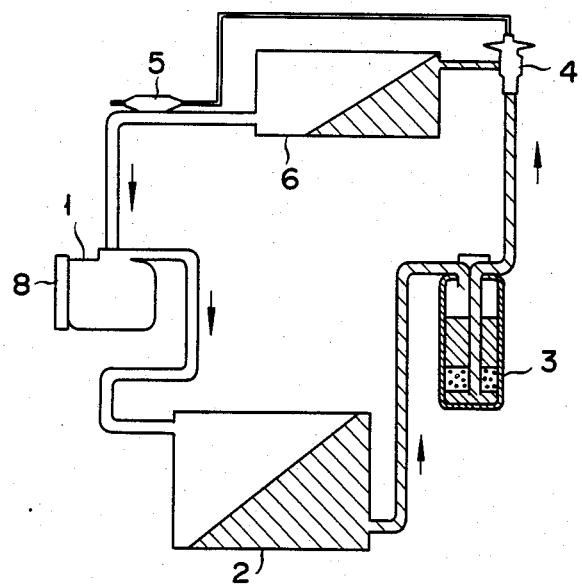
FIG. 1 is a diagram illustrating the operating principle of an automotive space cooling cycle.

A coolant pipe 15 illustrated in FIG. 3 represents part of a coolant pipe interposed between a condenser 2 and an expansion valve 4 in the diagram of FIG. 1. Inside the coolant pipe 15 is circulated a high-pressure liquid coolant 12. To the coolant pipe 15 is attached a casing 16 containing an empty space which communicates with the interior of the coolant pipe 15 through an opening 17 formed therein. This casing 16 is provided with a sensor 14 which comprises a small diameter part 14a reaching into the interior of the coolant pipe 15 and a large-diameter part 14b disposed inside the casing 16.

This sensor 14 has an operating fluid 13 sealed therein and is provided with a diaphragm 23 as a movable part actuated by the difference between the pressure of the operating fluid 13 and the pressure of the coolant 12. A switch 10 which comprises a stationary contact piece 19 fitted inside the casing 16 and provided with a switch terminal 22 and a movable contact piece 21 fitted inside the casing 16, provided with a switch terminal 18, and interlocked with the diaphragm 23 is electrically connected to an alarm device 11.

Figure 4:
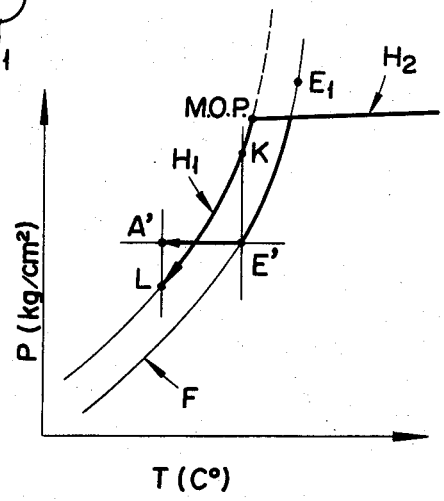
FIG. 4 is a diagram illustrating the operating principle of the apparatus of FIG. 3 disposed in a space cooling cycle.

The temperature-pressure relation of the operating fluid sealed in the aforementioned sensor 14 and that of the aforementioned coolant in circulation are illustrated in FIG. 4. In the diagram, the vertical axis represents the scale of pressure, P, and the horizontal axis the scale of temperature, T. The symbol $H_1$ denotes the saturated liquid curve of the operating fluid 13 and the symbol F denotes the saturated liquid curve of the coolant 12 in circulation. It is noted from the diagram that the saturated pressure of the operating fluid 13 is higher than that of the coolant 12 in circulation. In the aforementioned sensor 14, the operating fluid 13 is sealed in a fixed volume. So far as the operating fluid 13 remains, if partly, in the liquid state, the pressure increases along the saturated liquid curve $H_1$ with the increasing temperature T. When the temperature exceeds a certain level, the operating fluid 13 is wholly gasified and the conditions above a straight line $H_2$ are assumed in which the pressure is not substantially increased for the increasing temperature. Let M.O.P. stand for the point at which the aforementioned operating fluid 13 shifts from the saturated state permitting coexistence of gaseous and liquid operating fluid to the wholly gaseous state, and the M.O.P. point will be adjusted by increasing and decreasing the volume of the operating fluid 13 sealed in the aforementioned sensor 14.

When the volume of the operating fluid 13 sealed in the sensor is increased, since the temperature at which the operating fluid 13 is wholly gasified rises, the M.O.P. point will rise along the saturated liquid curve $H_1$. In other words, the M.O.P. (maximum operating pressure) which represents the highest possible pressure of the operating fluid 13 can be freely set by limiting the volume of the operating fluid 13 to be sealed in the sensor.

In accordance with the present invention, the apparatus for alarming abnormal coolant in the space cooling cycle is constructed as described above and, therefore, possesses the following operation and effect.

FIG. 5 represents the space cooling cycle of FIG. 1 on a Mollier diagram. In the diagram, the vertical axis represents the scale of pressure P and the horizontal axis the scale of enthalpy i. In the diagram, the symbol F represents the saturated liquid curve of the coolant 12 and the symbol G the saturated gas curve of the coolant 12. One space cooling cycle is shown by a solid line A→B→C→D→E→A or a chain line A'→B'→C'→D'→E'→A', which represent one cycle during normal supply of the coolant or one cycle during excess supply of the coolant. The solid line D→E→A and the chain line D'→E'→A' each represent a condition existing between the discharge outlet of the compressor 1 and the expansion valve 4. The solid line E→A and the chain line E'→A' each represent a subcool of the coolant. When the space cooling cycle is filled with the normal volume of the coolant, the coolant within the liquid tank 3 occurs partly in a gaseous state and partly in a liquid state and assumes the saturated condition or the condition of Point E on the saturated liquid curve P. When the space cooling cycle is filled with an excess volume of the coolant, the liquid tank 3 is filled to capacity with the coolant in a liquid state and subcool proceeds also within the liquid tank 3. Thus, the volume of subcool increases as shown in FIG. 5. The change E'→A' in the subcool condition of the coolant 2 when the subcool is increased corresponds to the line E'→A' shown in FIG. 4. Since the coolant 12 maintains its continuity around the operating fluid 13 as illustrated in FIG. 3, the operating fluid 13 and the coolant 12 share one temperature change. When the coolant 12 makes this change of state E'→A' as shown in FIG. 4, the operating fluid 13 makes a change of state as indicated by K→L. Consequently, the pressure of the operating fluid 13 becomes lower than the pressure of the coolant 12. When the space cooling cycle is excessively filled with the coolant, the subcool increases and the pressure of the operating fluid 13 within the sensor 14 disposed inside the pipe 15 between the liquid tank 3 and the expansion valve 4 becomes lower than the pressure of the coolant 12 surrounding the sensor 14. It is further noted that this phenomenon of pressure reversion can be adjusted by varying the saturated pressure of the operating fluid to be sealed in the sensor 14.

When the pressure of the operating fluid 13 within the sensor 14 becomes lower than the pressure of the coolant 12, the diaphragm 23 is actuated to turn on the circuit incorporating the alarm device 11 and set off the alarm device 11, enabling the worker responsible for supplying the coolant or the operator of the car to perceive the abnormal coolant condition.

When the pressure of the coolant 12 circulated in the space cooling cycle is abnormally increased as by a sudden change in the car speed, for example, the alarm device informs the car operator of the abnormal coolant condition. Let the point of the symbol $E_1$ in the diagram of FIG. 4 represent the condition in which the coolant 12 assumes an abnormally high pressure, then the condition of the operating fluid 13 within the sensor 14 for sensing that condition falls above the line $H_2$. Thus, the pressure of the operating fluid 13 becomes lower than that of the coolant 12. Consequently, the diaphragm 23 within the pressure switch 10 is actuated to turn on the circuit incorporating the alarm device 11, enabling the car operator to perceive the presence of the abnormal condition of the coolant. In other words, the alarm is set off when the pressure of the coolant 12 exceeds the M.O.P. value of the operating fluid 13. Since the M.O.P. value of the operating fluid 13 can be freely set as described above, the pressure at which the alarm is desired to be issued may be varied as desired.

Figure 2:
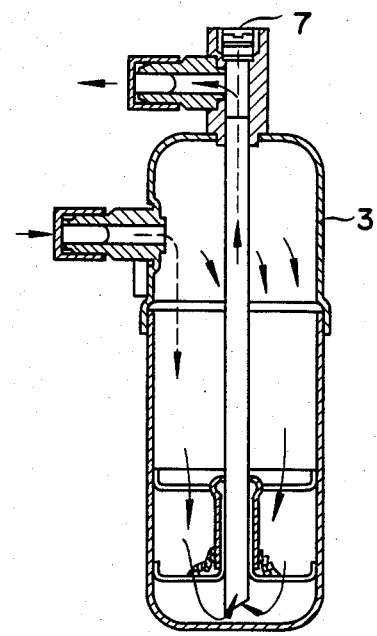
FIG. 2 is a longitudinal cross section illustrating the construction of a liquid tank.
Figure 6:
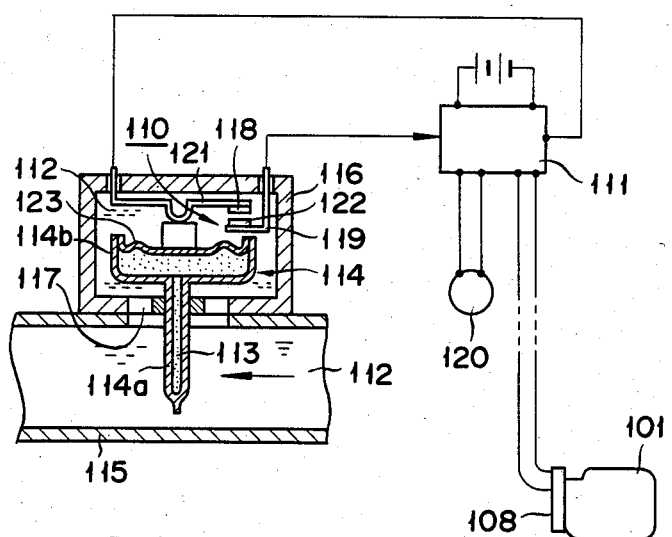
FIG. 6 is a schematic diagram illustrating an apparatus for alarming abnormal coolant in a space cooling cycle, as another embodiment of this invention.
Figure 7:
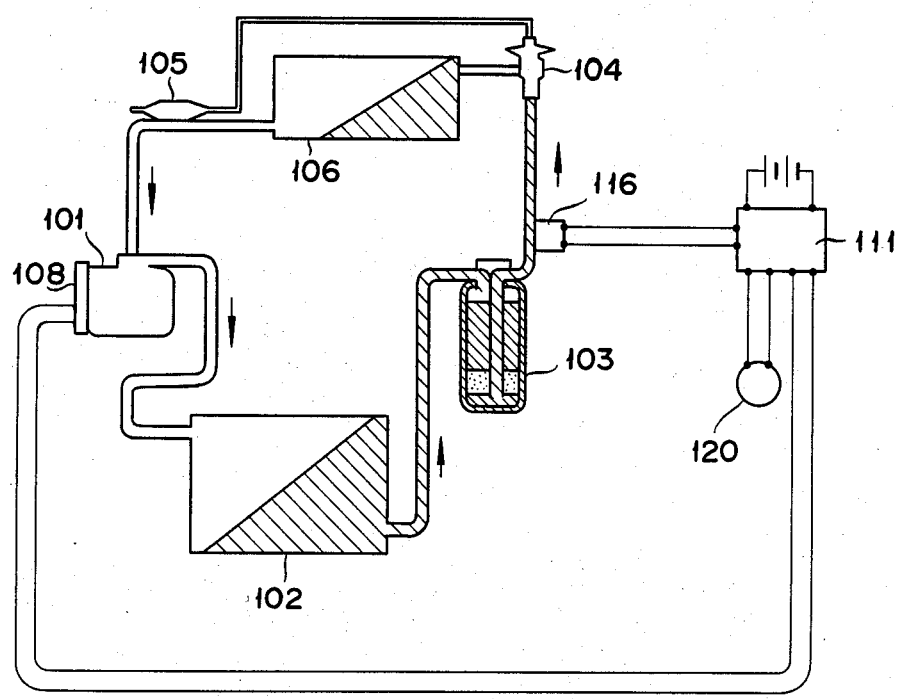
FIG. 7 is a diagram illustrating the operating principle of the apparatus of FIG. 6 disposed in a space cooling cycle.

FIG. 6 represents a schematic diagram illustrating an apparatus for alarming abnormal coolant in a space cooling cycle as another embodiment of the present invention. FIG. 7 is a schematic diagram illustrating the apparatus of FIG. 6 as disposed in a space cooling cycle for alarming abnormal coolant in the space cooling cycle. In these diagrams, those members which find countertypes in FIG. 1 and FIG. 2 are denoted by like numerical symbols plus 100.

A coolant pipe 115 shown in FIG. 6 represents part of the coolant pipe disposed between the condenser 2 and the expansion valve 4 in the apparatus of FIG. 1. Inside this coolant pipe 115, a coolant 112 of high pressure is circulated. To this coolant pipe 115 is attached a casing 116 which contains an empty space communicating with the interior of the coolant pipe 115 through an opening 117 formed therein. This casing 116 is provided with a sensor 114 which comprises a small-diameter part 114a reaching into the interior of the coolant pipe 115 and a large-diameter part 114b disposed inside the casing 116.

This sensor 114 has an operating fluid 113 sealed therein and is provided with a diaphragm 123 as a movable part adapted to be actuated by the difference between the pressure of the operating fluid 113 and that of the coolant 112. A switch 110 which comprises a stationary contact piece 119 disposed inside the casing 116 and provided with a switch terminal 23 and a movable contact piece disposed inside the casing 116, provided with a switch terminal 119, and interlocked with the diaphragm 123 is electrically connected to a timer circuit 111. The switch 110 or the diaphragm 123 is provided with a snapping mechanism and, thus, is adapted to produce a snapping action and assume hysteresis. Specifically, the switch 110 which is interlocked with the aforementioned diaphragm 123 is so adapted as to close its circuit when the difference of pressure reaches a prescribed level and open the circuit when the difference of pressure deviates from the prescribed level. The pressure difference at which the switch is made will be called "set value" and the pressure difference at which the switch is broken as "DIFF value."

The aforementioned timer circuit 111 is electrically connected to the alarm device 120 and to the magnet clutch 108 which is a drive transmission mechanism for the compressor 101 forming part of the space cooling cycle. This timer circuit 111 functions to measure the operating duration of the switch, i.e. the interval between the time the switch is closed and the time the switch is opened, discriminate the abnormal condition of the coolant between the status of excess supply and the status of abnormal pressure in accordance with the aforementioned operating duration and, in the case of the former status, actuates the magnet clutch to suspend the operation of the compressor and, in the case of the latter status, suspends the operation of the compressor and energizes the circuit for the alarm device 120.

The temperature-pressure relation of the operating fluid 113 sealed in the aforementioned sensor 114 and that of the aforementioned coolant in circulation are shown, as described above, in FIG. 4.

The apparatus of this invention for alarming abnormal coolant in the space cooling cycle is constructed as described above. Now, the operation and effect of this invention will be described below with reference to FIG. 5.

In addition to the effect brought about by the embodiment illustrated in FIG. 3, the present embodiment manifests the following effect. As the pressure of the operating fluid 113 within the aforementioned sensor 114 becomes lower than that of the coolant 112, the diaphragm 123 is actuated to bring the switch terminals 118, 122 into mutual contact and switch on the magnet clutch 108 which is a drive force transmission mechanism for the timer circuit 111 and the compressor 101. As the switch is closed for the aforementioned timer circuit 111, the timer circuit starts clocking the time until the switch is opened. When the switch is closed for the magnet clutch 108, the compressor 101 stops its operation because the transmission of drive force from the car engine is interrupted. This stop of the operation of the compressor 101 results in the suspension of the circulation of the coolant in the space cooling cycle. The time-course change of the pressure difference between the coolant 112 surrounding the sensor 114 and the operating fluid 113 within the sensor 114 in this case is shown in FIG. 8 (a). When the coolant is in excess supply as shown in FIG. 8 (a), once the aforementioned pressure difference exceeds the set value (the pressure difference at which the switch is closed, as already described), it will not readily return to the DIFF value (the pressure difference at which the switch is opened as described above). This is because in the case of much excess supply of the coolant, unlike the case of simple rise of the pressure of the coolant, the coolant will remain in the state of subcool and will not immediately return to the state of saturation and the pressure of the coolant will not readily fall when the operation of the compressor 101 is stopped. Thus, the aforementioned timer circuit measures the interval between the time the aforementioned switch is turned on and the time it is turned off and, when the interval so measured exceeds the time t shown in FIG. 8 (c), for example, the timer circuit turns on the circuit of the alarm device 120 as shown in FIG. 8 (e). In other words, when the coolant in the space cooling cycle is in excess supply, the alarm device 120 enables the worker responsible for supply of the coolant or the car operator to perceive the condition of excess supply of the coolant.

Further in the apparatus of the present invention, when the pressure of the coolant 112 circulated in the space cooling cycle is abnormally raised as when the car speed is suddenly changed, the operation of the compressor can be turned on and off as described below.

Let the point of the symbol $E_1$ shown in FIG. 5 stand for the condition in which the pressure of the coolant 112 is abnormally raised, then the condition of the operating fluid 113 within the sensor 114 which perceives this abnormal rise of the pressure of the coolant 112 falls above the line $H_2$. The pressure of the operating fluid 113, therefore, becomes lower than that of the coolant 112. Consequently, the diaphragm 123 in the upper part of the sensor 114 is actuated to turn on the switch for the magnet clutch 108 which is the drive force transmission mechanism for the timer circuit 111 and the compressor 101. As the switch is closed for the aforementioned timer circuit 111, the timer circuit 111 starts clocking the time until the switch is opened. As the switch is closed for the magnet clutch 108, the compressor 101 stops its operation because the transmission of the drive force from the car engine is interrupted. The stopped operation of the compressor 101 results in a stop of the circulation of the coolant within the space cooling cycle. The time-course change of the pressure difference occurring in this case between the coolant 112 surrounding the sensor 114 and the operating fluid 113 within the sensor 114 is shown in FIG. 9 (a). As is apparent from FIG. 9 (a), in the case of abnormal rise of the pressure of the coolant, when the aforementioned pressure difference exceeds the set value, it will quickly return to the DIFF value. This is because in the case of abnormally high pressure of the coolant, unlike the case in which the coolant is in excess supply, the subcool of the coolant will have no bearing upon the situation and the pressure of the coolant will quickly fall when the operation of the compressor is stopped. Thus, the aforementioned timer circuit, as shown in FIG. 9 (c), turns itself on and off in concert with the operation of the switch and, at the same time, starts clocking the operation duration of the switch and, when the time so clocked is shorter than the time t shown in FIG. 8 (c), allows the circuit of the alarm device 120 to remain in its off status. The operation of the compressor is turned on and off in concert with the aforementioned turning on and off of the switch.

The operating fluids 13 and 113 to be used in the foregoing embodiments are required to have higher saturation pressure than the respective coolants 12 and 112. When R12 (Freon gas) is used as the coolant 12 or 112, for example, a mixed gas prepared by adding an inert gas such as nitrogen gas to R12 and consequently allowed to possess higher pressure than R12 may be used as the operating fluid 13 or 113.

This invention is not limited to the embodiments described above but may be modified as shown below, for example.

In the place of the diaphragms 23 and 123 incorporated within the aforementioned casings 16 and 116, the upper part of the sensor may be fabricated in the form of bellows adapted to be moved in the vertical direction by the pressure difference between the interior and exterior of the sensor. In this modified embodiment, the apparatus manifests the same operation and effect as when the apparatus makes use of the aforementioned diaphragms 23 and 123.

As the aforementioned alarm devices 11 and 111, virtually any means may be effectively used so long as the means is capable of inciting any of the five senses of the worker or car operator. An alarm buzzer and an alarm lamp are possible examples.

As is plain from the description given above, this invention has just one and the same apparatus to carry out the work of detecting the excess supply and abnormal pressure rise of the coolant in the space cooling cycle which are apt to impair the cooling capacity of the cycle and, at the same time, the work of effecting a necessary measure such as alarming the worker responsible for supplying the coolant or the car operator. Thus, by the use of a simple and inexpensive apparatus which does not require incorporation of any expensive device like a high-pressure switch, the present invention manifests an outstanding effect of detecting abnormal coolant within the space cooling cycle and enabling the space cooling cycle to be operated always in a normal condition at its full capacity.

What is claimed is:

1. An apparatus for alarming abnormal coolant in a space cooling cycle, comprising a compressor, a coolant passage for guiding high-pressure side liquid coolant in said space cooling cycle, a sensor disposed in said coolant passage and provided with a movable part having an operating fluid sealed therein and adapted to be operated by the difference of the pressure of said operating fluid and that of said liquid coolant, and an alarm-actuating switch disposed in said coolant passage and interlocked with the movable part, and said operating fluid having higher saturated pressure than the saturated pressure of said coolant and possessing an ability to operate said switch when the extent of subcool of said coolant exceeds a prescribed level and the pressure of the coolant exceeds the pressure of said operating liquid and when the pressure of the coolant exceeds the pressure under which said operating fluid is wholly in a gasified state.

2. An alarming apparatus according to claim 1, wherein said sensor comprises a small-diameter part having the leading end thereof reach into said coolant path and a large-diameter part connected to the upper part of said small-diameter part and disposed within a casing and said casing is disposed by said coolant path and adapted to communicate with said coolant path.

3. An alarming apparatus according to claim 2, wherein said movable part is a diaphragm.

4. An alarming apparatus according to claim 3, wherein said alarm-actuating switch comprises a switch terminal attached to a stationary contact piece and a switch terminal attached to a movable contact piece interlocked with said diaphragm.

5. An alarming apparatus according to claim 1, wherein said alarm-actuating switch is adapted to turn on and off said compressor and is provided with a timer circuit serving to clock the operating duration of said alarm actuating switch and actuate an alarm device when the operating duration so clocked exceeds a prescribed value.

6. An alarming apparatus according to claim 5, wherein said alarm device is interlocked with said timer circuit.

7. An alarming apparatus according to claim 6, wherein said timer circuit is electrically connected to said alarm device and a drive mechanism for a compressor forming part of said space cooling cycle and is adapted to clock the operating duration of said alarm-actuating switch and discriminate the condition of abnormality of said coolant depending on the operating duration so clocked.

8. An alarming apparatus according to claim 7, wherein said timer circuit, on judging the condition of abnormality of said coolant to reside in excess supply of said coolant, actuates said drive transmission mechanism and stop the operation of the compressor.

9. An alarming apparatus according to claim 7, wherein said timer circuit, on judging the condition of abnormality of said coolant to reside in abnormally high pressure of said coolant, actuates said drive transmission mechanism to stop the operation of the compressor and, at the same time, actuates said alarm device.

* * * * *

UNITED STATES PATENT AND TRADEMARK OFFICE
CERTIFICATE OF CORRECTION

PATENT NO. : 4,614,087
DATED : September 30, 1986
INVENTOR(S) : Hiroyasu Nadamoto and Koichi Yoinara It is certified that error appears in the above—identified patent and that said Letters Patent is hereby corrected as shown below:

Col. 4, line 32; "horizontalaxis" should read -- horizontal axis --
Col. 4, line 38; "represent" should read -- represents --
Col. 4, line 55; "coolant 2" should read -- coolant 12 --
Col. 6, line 14; "discriminate" should read -- discriminates --
Col. 7, line 45-46; "operation" should read -- operating --
Col. 10, line 2; "stop" should read -- stops --

Signed and Sealed this

Tenth Day of March, 1987

*Attest:*

DONALD J. QUIGG

*Attesting Officer*  *Commissioner of Patents and Trademarks*